(12) United States Patent
Ishizuka et al.

(10) Patent No.: US 8,309,181 B2
(45) Date of Patent: Nov. 13, 2012

(54) METHOD OF MANUFACTURING POLYMER FILM

(75) Inventors: Kenichi Ishizuka, Ashigara-kami-gun (JP); Taisei Nishimi, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 262 days.

(21) Appl. No.: 12/868,385

(22) Filed: Aug. 25, 2010

(65) Prior Publication Data

US 2011/0052821 A1 Mar. 3, 2011

(30) Foreign Application Priority Data

Aug. 27, 2009 (JP) ................................ 2009-196899

(51) Int. Cl.
*B05D 3/02* (2006.01)
(52) U.S. Cl. .................... 427/385.5; 427/379; 427/381; 427/384
(58) Field of Classification Search .................. None
See application file for complete search history.

(56) References Cited

U.S. PATENT DOCUMENTS

| | | | | |
|---|---|---|---|---|
| 5,238,634 | A | * | 8/1993 | Fetters et al. ................... 264/184 |
| 2006/0231525 | A1 | * | 10/2006 | Asakawa et al. ................. 216/56 |
| 2007/0072069 | A1 | * | 3/2007 | Yamada et al. ................ 429/145 |
| 2007/0286882 | A1 | * | 12/2007 | Tang et al. .................... 424/423 |

FOREIGN PATENT DOCUMENTS

JP 3979470 B2 7/2007

OTHER PUBLICATIONS

Welander et al., "Rapid Directed Assembly of Block Copolymer Films at Elevated Temperatures," Macromolecules, published on Web Apr. 1, 2008, vol. 41(8) pp. 2759-2761.
Grulke, "Solubility Parameter Values," Polymer Handbook, Fourth Edition, vol. 2, John Wiley & Sons, 1999, pp. 675-714.
Nippon Setchaku Kyokaishi, vol. 22, No. 10, 1986, pp. 564-567, 7 pages with partial English translation.

* cited by examiner

*Primary Examiner* — Erma Cameron
(74) *Attorney, Agent, or Firm* — Sughrue Mion, PLLC (57) ABSTRACT

A method of manufacturing a polymer film having a microphase-separated morphology includes a film-forming step in which a solution containing a block copolymer having two or more types of polymer chains which are mutually incompatible and are bonded to each other, a first solvent and a second solvent having a higher boiling point by at least 15° C. than the first solvent is applied onto a substrate and the first solvent is removed to form a film; a heating step in which the film is heated at a temperature which is higher than the boiling point of the first solvent but is lower than the boiling point of the second solvent to make the film formed have a microphase-separated morphology; and a solvent removal step in which the second solvent is removed from the film having the microphase-separated morphology to form the polymer film having the microphase-separated morphology.

10 Claims, 5 Drawing Sheets

METHOD OF MANUFACTURING POLYMER FILM

BACKGROUND OF THE INVENTION

The present invention relates to a method of manufacturing a polymer film and more specifically to a method of manufacturing a polymer film having a microphase-separated morphology in a short time under low-temperature conditions.

Recently, in the fields of optical materials and electronic materials, there has been a growing demand for greater integration, higher information density, and image information of higher definition. Materials and structures having been controlled for the morphology at the nanometer level are required in order to cope with such a demand.

Micropatterning processes that have been proposed to prepare such materials and structures include bottom-up techniques in which a microstructure is manufactured by employing "self-assembly"—i.e., the spontaneous formation of an ordered pattern. Of such techniques, block copolymers formed by bonding two or more different types of polymer chains are known to undergo phase separation at the deca-nanometer level by self-assembly to form a so-called "microphase-separated morphology." For example, it is believed that, were it possible to orient the cylindrical or lamellar microdomains of such a microphase-separated morphology perpendicularly to a flexible substrate, the resulting structures could be adapted for use as, e.g., phase shift films, polarizing films, components for electronic displays, and magnetic recording media, and employed in thus way in a broad range of fields, including the energy, the environment and the life sciences.

In cases where a block copolymer is used to form a microphase-separated morphology, the microphase-separated morphology can be typically formed by heating the block copolymer for a long time under high-temperature conditions (e.g., 200° C.) above the glass transition temperature (Tg) of the polymer chains making up the block copolymer and gradually cooling the heated block copolymer. Such a conventional method requires enormous energy and a long time to form a desired microphase-separated morphology and was not necessarily a satisfactory method from an industrial point of view.

There have recently been proposed several methods of forming a microphase-separated morphology with a block copolymer under lower-temperature conditions or in a short time. For example, JP 3979470 B describes preparing a polymer film having a perpendicular cylindrical microphase-separated morphology by applying a block copolymer having a predetermined liquid crystal mesogen at the side chains onto a PET substrate and heating the applied block copolymer for several hours under low-temperature conditions of around 100° C. Adam M. Welander, et al. ("Rapid Directed Assembly of Block Copolymer Films at Elevated Temperatures", Macromolecules, 2008, vol. 41, pp. 2759-2761) describes that a block copolymer of polystyrene and polymethyl methacrylate is used to form a film on a substrate having a predetermined pattern morphology and the film is heated at high temperatures to manufacture a polymer film having a microphase-separated morphology in a short time.

SUMMARY OF THE INVENTION

According to JP 3979470 B, the microphase-separated morphology is formed in the film at low temperatures, but the block copolymer used needs to have a special structure, the process lacks versatility and application to other polymers is limited.

According to Adam M. Welander, et al., the microphase-separated morphology is formed in the film in a short time, but heating treatment at high temperatures of about 250° C. needs to be performed, which limits the types of substrate and polymer that can be used, and therefore the process lacks versatility. Particularly in cases where a polymer substrate is used, heat deterioration and morphological changes occur under such high-temperature treatments, making it impossible to obtain a desired structure.

In addition, the process of Adam M. Welander, et al. requires large-sized devices for high temperature treatments at the time of industrialization. Therefore, it is difficult to manufacture a large amount of large-area structures having a desired microphase-separated morphology.

In order to solve the above-described prior art problems, an object of the present invention is to provide a method which is also applicable to various block copolymers and various flexible substrates including polymer substrates, and is capable of manufacturing a polymer film having a microphase-separated morphology in a short time at a low cost under low-temperature conditions.

The inventors of the present invention have made an intensive study and as a result found that a polymer film of a block copolymer having a microphase-separated morphology can be obtained in a short time under low-temperature conditions by using two types of solvents having different boiling points (high-boiling point solvent and low-boiling point solvent).

That is, the inventors of the present invention have made an intensive study and as a result found that the above object of the present invention is achieved by the characteristic features described in (1) to (10) below.

(1) A method of manufacturing a polymer film having a microphase-separated morphology comprising: a film-forming step in which a solution containing a block copolymer having two or more types of polymer chains which are mutually incompatible and are bonded to each other, a first solvent and a second solvent having a higher boiling point by at least 15° C. than the first solvent is applied onto a substrate and the first solvent is removed to form a film; a heating step in which the film obtained by the film-forming step is heated at a temperature which is higher than a boiling point of the first solvent but is lower than the boiling point of the second solvent to make the film formed have a microphase-separated morphology; and a solvent removal step in which the second solvent is removed from the film having the microphase-separated morphology obtained by the heating step to form the polymer film having the microphase-separated morphology.

(2) The method according to (1), wherein a volumetric ratio between a volume of the block copolymer ($\Phi$poly) and a total volume ($\Phi$poly+$\Phi$sol) of the volume of the block copolymer ($\Phi$poly) and a volume of the second solvent ($\Phi$sol) in the solution [$\Phi$poly/($\Phi$poly+$\Phi$sol)] is from 0.1 to 0.75.

(3) The method according to (1) or (2), wherein the first solvent has the boiling point of less than 170° C.

(4) The method according to any one of (1) to (3), wherein a heating temperature of 80 to 170° C. is applied in the heating step for forming the film having the microphase-separated morphology.

(5) The method according to any one of (1) to (4), wherein a heating time of up to 30 minutes is applied in the heating step for forming the film having the microphase-separated morphology.

(6) The method according to any one of (1) to (5), wherein the substrate is a flexible substrate.

(7) The method according to any one of (1) to (6), wherein one of the polymer chains making up the block copolymer is selected from the group consisting of polystyrenes, poly(meth)acrylates, polyalkylene oxides, polybutadienes and polyisoprenes.

(8) The method according to any one of (1) to (7), wherein the polymer film has a thickness of 10 to 1,000 nm.

(9) The method according to any one of (1) to (8), wherein the substrate has a silane coupling agent layer formed from a silane coupling agent on its surface.

(10) The method according to any one of (1) to (9), wherein one of phases in the microphase-separated morphology is a lamellar or cylindrical phase oriented perpendicularly to the substrate.

The present invention can provide a method which is also applicable to various block copolymers and various flexible substrates including polymer substrates, and is capable of manufacturing a polymer film having a microphase-separated morphology in a short time at a low cost under low-temperature conditions.

DETAILED DESCRIPTION OF THE INVENTION

The method of manufacturing a polymer film having a microphase-separated morphology and the polymer film obtained by the manufacturing method according to the present invention are described below.

According to the manufacturing method of the present invention, two types of solvents having different boiling points are used to perform heating treatment under predetermined conditions to enable a microphase-separated morphology to be formed in a film in a short time under low-temperature conditions. Therefore, this method is also applicable to a roll-to-roll system and is of a very high industrial value.

The manufacturing method is first described below in detail.

(Method of Manufacturing Polymer Film Having Microphase-Separated Morphology)

The polymer film-manufacturing method of the present invention mainly has the following steps:

(film-forming step) a step in which a solution containing a block copolymer having two or more types of polymer chains which are mutually incompatible and are bonded to each other, a first solvent and a second solvent having a higher boiling point by at least 15° C. than the first solvent is applied onto a substrate and the first solvent is removed to form a film;

(heating step) a step in which the film obtained by the film-forming step is heated at a temperature which is higher than the boiling point of the first solvent but is lower than the boiling point of the second solvent to make the film formed have a microphase-separated morphology; and (solvent removal step) a step in which the second solvent is removed from the film having the microphase-separated morphology as obtained by the heating step to form a polymer film having the microphase-separated morphology.

The procedures in the respective steps and the materials used in the respective steps are described below in detail.

(Film-Forming Step)

The film-forming step is a step in which a solution containing a block copolymer having two or more types of polymer chains which are mutually incompatible and are bonded to each other, a first solvent and a second solvent having a higher boiling point by at least 15° C. than the first solvent is applied onto a substrate and the first solvent is removed to form a film. This step enables a film of a block copolymer containing the second solvent to be prepared.

The materials used are first described below in detail.

(Block Copolymer)

The term "block copolymer" generally refers to a copolymer in which a plurality of types of homopolymer chains are bonded to each other as blocks (components). For example, there are polymers in which a polymer A chain composed of monomer A repeating units and a polymer B chain composed of monomer B repeating units are bonded together at their respective ends.

The block copolymer used in the present invention is composed of two or more types of polymers that are mutually incompatible, and may be in the form of any one of the following: a diblock copolymer, a triblock copolymer or a multiblock copolymer. Specifically, referring to a portion composed of polymer A as an "A block" and a portion composed of polymer B as a "B block," exemplary block copolymers include A-B type block copolymers having an -A-B- structure and composed of one A block bonded with one B block, A-B-A type block copolymers having an -A-B-A- structure and composed of A blocks bonded to both ends of a B block, and B-A-B type block copolymers having a -B-A-B- structure and composed of B blocks bonded to both ends of an A block. In addition, use may also be made of block copolymers which have a -(A-B)$_n$- structure and are composed of a plurality of A blocks and B blocks. Of these, from the standpoint of availability and ease of synthesis, A-B type block copolymers (diblock copolymers) are preferred. The chemical bonds connecting the polymers to each other are preferably covalent bonds.

Illustrative examples of the polymers which make up the block copolymer used in the present invention include:

vinyl polymers such as polystyrenes (e.g., polystyrene, polymethylstyrene, polydimethylstyrene, polytrimethylstyrene, polyethylstyrene, polyisopropylstyrene, polychloromethylstyrene, polymethoxystyrene, polyacetoxystyrene, polychlorostyrene, polydichlorostyrene, polybromostyrene, polytrifluoromethylstyrene), poly(meth)acrylates (e.g., polymethyl methacrylate, polyethyl methacrylate, polybutyl methacrylate, polyisobutyl methacrylate, polyhexyl methacrylate, poly(2-ethylhexyl methacrylate), polyisodecyl methacrylate, polylauryl methacrylate, polyphenyl methacrylate, polymethoxyethyl methacrylate, polymethyl acrylate, polyethyl acrylate, polybutyl acrylate, polyhexyl acrylate, poly(2-ethylhexyl acrylate), polyphenyl acrylate, polymethoxyethyl acrylate, polyglycidyl acrylate), polyvinyl acetate, polyvinyl propionate, polyvinyl butyrate, polyvinyl isobutyrate, polyvinyl caproate, polyvinyl chloroacetate, polyvinyl methoxyacetate, polyvinyl phenyl acetate, polyethylene, polypropylene, polyisobutylene, polyvinyl chloride, polyvinylidene chloride, polytetrafluoroethylene and polyvinylidene fluoride;

diene polymers such as polybutadienes and polyisoprenes;

ether polymers such as polyalkylene oxides (e.g., polymethylene oxide, polyethylene oxide, polypropylene oxide), polythioether, polydimethylsiloxane and polyethersulfone;

ester-based condensation polymers such as poly(ε-caprolactone) and polylactic acid; and amide-based condensation polymers such as nylon 6, nylon 66, poly(m-phenylene isophthalamide), poly(p-phenylene terephthalamide) and polypyromellitimide. The combination of polymer chains making up the block copolymer is not subject to any particular limitation, provided the polymer chains used are mutually incompatible. For example, combinations of different vinyl polymers, a vinyl polymer with a diene polymer, a vinyl polymer with an ether polymer, a vinyl polymer with an ester-based condensation polymer, or different diene polymers are preferred. The use of one or more vinyl polymers is more preferred. The use of a combination of different vinyl polymers is most preferred.

Of these, one polymer chain making up the block copolymer is preferably selected from the group consisting of polystyrenes, poly(meth)acrylates, polyalkylene oxides, polybutadienes and polyisoprenes because the microphase-separated morphology is obtained at low temperatures in a shorter time and these materials are versatile. Two of the above-described polymers are more preferably used to form the block copolymer.

More specific examples include polystyrene/polymethyl methacrylate, polystyrene/polyethylene oxide, polyisoprene/poly(2-vinylpyridine), polymethyl acrylate/polystyrene, polybutadiene/polystyrene, polyisoprene/polystyrene, polystyrene/poly(2-vinylpyridine), polystyrene/poly(4-vinylpyridine), polystyrene/polydimethylsiloxane, polybutadiene/polyethylene oxide and polystyrene/polyacrylic acid.

Of these, from the standpoint of availability and versatility, block copolymers such as polystyrene/polymethyl methacrylate, polystyrene/polyethylene oxide, polyisoprene/polystyrene, polystyrene/poly(2-vinylpyridine), polystyrene/poly(4-vinylpyridine) and polybutadiene/polyethylene oxide are preferred.

The weight-average molecular weight (Mw) of the block copolymer is suitably selected according to the intended use, and is preferably at least $1 \times 10^4$, more preferably from $1 \times 10^4$ to $1 \times 10^7$, and even more preferably from $5 \times 10^4$ to $1 \times 10^6$. This weight-average molecular weight (Mw) is the polystyrene-equivalent weight-average molecular weight obtained following measurement by gel permeation chromatography (GPC).

The block copolymer preferably has a narrow molecular weight distribution. Specifically, the molecular weight distribution (Mw/Mn) expressed in terms of the weight-average molecular weight (Mw) and the number-average molecular weight (Mn) is preferably from 1.00 to 1.50, and more preferably from 1.00 to 1.15. By having the Mw/Mn value fall within the above range, a microphase-separated morphology of more uniform size can be formed.

The copolymerization ratio of the block copolymer is suitably selected according to the desired microphase-separated morphology.

For example, in cases where a diblock copolymer (A-B type) or a triblock copolymer (A-B-A type) is used to prepare a cylindrical microphase-separated morphology, the volumetric ratio between polymer A and polymer B which make up the copolymer (polymer A/polymer B) is preferably from 0.9/0.1 to 0.65/0.35 or from 0.35/0.65 to 0.1/0.9, and more preferably from 0.8/0.2 to 0.7/0.3 or from 0.3/0.7 to 0.2/0.8.

In cases where a similarly composed lamellar microphase-separated morphology is prepared, the volumetric ratio between polymer A and polymer B which make up the copolymer (polymer A/polymer B) is preferably from 0.65/0.35 to 0.35/0.65, and more preferably from 0.6/0.4 to 0.4/0.6.

Within the above ranges, a cylindrical or lamellar microphase-separated morphology having a more ordered array can be obtained.

The block copolymer of the present invention may be synthesized by a known method. Commercially available products may also be used.

(Solvent (First Solvent, Second Solvent))

The present invention uses two types of solvents including a first solvent (low boiling point solvent) and a second solvent (high boiling point solvent) which have a boiling point difference of at least 15° C. Use of solvents having different boiling points enables a film of a block copolymer which contains the second solvent serving as the plasticizer to be prepared, thus forming a microphase-separated morphology in a short time under low-temperature conditions as will be described later.

The difference in the boiling point between the first solvent and the second solvent is at least 15° C. The boiling point difference is more preferably at least 20° C. and even more preferably at least 50° C. because a microphase-separated morphology having a more ordered array can be prepared in a shorter time. In terms of the heat deterioration of the material due to heating treatment, the upper limit of the boiling point difference is preferably up to 270° C., more preferably up to 240° C. and even more preferably up to 215° C.

The term "boiling point" as used herein refers to a boiling point at a pressure of 1 atm.

The first solvent and the second solvent are not particularly limited as long as the above relation is satisfied. Illustrative examples of these solvents include hydrocarbon solvents, halogenated hydrocarbon solvents, alcohol solvents, ether solvents, acetal solvents, aldehyde solvents, ketone solvents, ester solvents, polyol solvents and derivatives thereof, carboxylic acid solvents and carboxylic anhydrides, nitrogen-containing compounds, sulfur-containing compounds, fluorine compounds and inorganic solvents. Of these, hydrocarbon solvents, halogenated hydrocarbon solvents, alcohol solvents, ether solvents, ketone solvents and ester solvents are preferred in terms of ease of handling.

Illustrative examples of the hydrocarbon solvents include aliphatic hydrocarbons such as octane, gasoline, cyclohexane, cyclohexene, cyclopentane, dipentene, camphor oil, petroleum ether, petroleum benzin, solvent naphtha, decalin, decane, tetralin, turpentine oil, kerosene, dodecane, nonane, pine oil, pinene, butane, propane, hexane, heptane, pentane, methylcyclohexane, methylcyclopentane, p-menthane, ligroin and liquid paraffin; and aromatic hydrocarbons such as amylbenzene, isopropylbenzene, ethylbenzene, xylenes, diethylbenzenes, cyclohexylbenzene, dimethylnaphthalene, cymenes, styrene, dodecylbenzene, toluene, naphthalene, biphenyl, benzene and mesitylene.

Illustrative examples of the halogenated hydrocarbon solvents include aliphatic halogenated hydrocarbons such as allyl chloride, 2-ethylhexyl chloride, amyl chloride, isopropyl chloride, ethyl chloride, butyl chloride, hexyl chloride, methyl chloride, methylene chloride, chloroform, carbon tetrachloride, 1,1-dichloroethane, 1,2-dichloroethane, 1,1-dichloroethylene, 1,2-dichloroethylene, dichlorobutanes, dichloropropane, dibromoethane, dibromobutane, dibromopropane, dibromopentane, allyl bromide, isopropyl bromide, ethyl bromide, octyl bromide, butyl bromide, propyl bromide, methyl bromide, lauryl bromide, 1,1,1,2-tetrachloroethane, 1,1,2,2-tetrachloroethane, tetrachloroethylene, tetrabromoethane, tetramethylene chlorobromide, 1,1,1-trichloroethane, 1,1,2-trichloroethane, trichloroethylene, bromochloroethane, 1-bromo-3-chloropropane, hexachloroethane and pentamethylene chlorobromide; and aromatic halogenated hydrocarbons such as naphthalene chlorides, o-chlorotoluene, p-chlorotoluene, chlorobenzene, 2,3-dichlorotoluene, 2,4-dichlorotoluene, 2,5-dichlorotoluene, 2,6-dichlorotoluene, 3,4-dichlorotoluene, 3,5-dichlorotoluene, m-dichlorobenzene, o-dichlorobenzene, p-dichlorobenzene, dibromobenzene, 1,2,3-trichlorobenzene, 1,2,4-trichlorobenzene, 1,2,5-trichlorobenzene, bromonaphthalene and bromobenzene.

Illustrative examples of the alcohol solvents include aliphatic alcohols such as n-amyl alcohol, s-amyl alcohol, t-amyl alcohol, allyl alcohol, isoamyl alcohol, isobutyl alcohol, isopropyl alcohol, undecanol, ethanol, 2-ethylbutanol, 2-ethylhexanol, ethylene chlorohydrin, 2-octanol, n-octanol, glycidol, cyclohexanol, 3,5-dimethyl-1-hexyn-3-ol, n-decanol, tetrahydrofurfuryl alcohol, α-terpineol, neopentyl alcohol, nonanol, fusel oil, n-butanol, s-butanol, t-butanol, furfuryl alcohol, propargyl alcohol, 1-propanol, n-hexanol, 2-heptanol, 3-heptanol, n-heptanol, benzyl alcohol, 3-pentanol, methanol, methylcyclohexanol, 2-methyl-1-butanol, 3-methyl-2-butanol, 3-methyl-1-butyn-3-ol, 4-methyl-2-pentanol and 3-methyl-1-pentyn-3-ol; and aromatic alcohols such as ethylphenol, octylphenol, catechol, xylenol, guaiacol, p-cumylphenol, cresol, m-cresol, o-cresol, p-cresol, dodecylphenol, naphthol, nonylphenol, phenol, benzylphenol and p-methoxyethylphenol.

Illustrative examples of the ether solvents include chain ethers such as anisole, ethyl isoamyl ether, ethyl-t-butyl ether, ethyl benzyl ether, cresyl methyl ether, diisoamyl ether, diisopropyl ether, diethyl ether, diphenyl ether, dibutyl ether, dipropyl ether, dibenzyl ether, dimethyl ether, bis(2-chloroethyl)ether, vinyl ethyl ether, vinyl methyl ether, phenetole, butyl phenyl ether, methyl-t-butyl ether and monochlorodiethyl ether; and cyclic ethers such as epichlorohydrin, epoxybutane, crown ethers, propylene oxide, dioxane, diglycidyl ether, 1,8-cineol, tetrahydropyran, tetrahydrofuran, trioxane, furan, furfural and methylfuran.

Illustrative examples of the acetal solvents include diethyl acetal and methylal.

Illustrative examples of the aldehyde solvents include acrolein and acetaldehyde.

Illustrative examples of the ketone solvents include acetylacetone, acetophenone, acetone, isophorone, ethyl-n-butyl ketone, diacetone alcohol, diisobutyl ketone, diisopropyl ketone, diethyl ketone, cyclohexanone, di-n-propyl ketone, phorone, mesityl oxide, methyl-n-amyl ketone, methyl isobutyl ketone, methyl ethyl ketone, methylcyclohexanone, methyl-n-butyl ketone, methyl-n-propyl ketone, methyl-n-hexyl ketone and methyl-n-heptyl ketone.

Illustrative examples of the ester solvents include adipic acid esters such as diethyl adipate and dioctyl adipate; citric acid esters such as triethyl acetylcitrate and tributyl acetylcitrate; acetoacetic acid esters such as allyl acetoacetate, ethyl acetoacetate and methyl acetoacetate; abietic acid esters such as methyl abietate; benzoic acid esters such as isoamyl benzoate, ethyl benzoate, butyl benzoate, propyl benzoate, benzyl benzoate and methyl benzoate; isovaleric acid esters such as isoamyl isovalerate and ethyl isovalerate; formic acid esters such as isoamyl formate, isobutyl formate, ethyl formate, butyl formate, propyl formate, hexyl formate, benzyl formate and methyl formate; citric acid esters such as tributyl citrate; silicic acid esters; cinnamic acid esters such as ethyl cinnamate and methyl cinnamate; acetic acid esters such as amyl acetate, allyl acetate, isoamyl acetate, isobutyl acetate, isopropyl acetate, ethyl acetate, 2-ethylhexyl acetate, cyclohexyl acetate, n-butyl acetate, s-butyl acetate, propyl acetate, benzyl acetate, methyl acetate and methyl cyclohexyl acetate; salicylic acid esters such as isoamyl salicylate, benzyl salicylate and methyl salicylate; oxalic acid esters such as diamyl oxalate, diethyl oxalate and dibutyl oxalate; tartaric acid esters such as diethyl tartrate and dibutyl tartrate; stearic acid esters such as amyl stearate, ethyl stearate and butyl stearate; sebacic acid esters such as dioctyl sebacate and dibutyl sebacate; carbonic acid esters such as diethyl carbonate, diphenyl carbonate and dimethyl carbonate; lactic acid esters such as amyl lactate, ethyl lactate, butyl lactate and methyl lactate; phthalic acid esters such as dimethyl phthalate, diethyl phthalate, diallyl phthalate, dibutyl phthalate, diisobutyl phthalate, di-n-hexyl phthalate, bis(2-ethylhexyl)phthalate, dioctyl phthalate, diisononyl phthalate, dinonyl phthalate, diisodecyl phthalate, butyl benzyl phthalate and dicyclohexyl phthalate; γ-butyrolactone; propionic acid esters such as isoamyl propionate, ethyl propionate, butyl propionate, benzyl propionate and methyl propionate; boric acid esters; maleic acid esters such as dioctyl maleate and dibutyl maleate; malonic acid esters such as diisopropyl malonate, diethyl malonate and dimethyl malonate; butyric acid esters such as isoamyl butyrate, isopropyl butyrate, ethyl butyrate, butyl butyrate and methyl butyrate; phosphoric acid esters such as 2-ethylhexyl diphenyl phosphate, triamyl phosphate, tributyl phosphate, tricresyl phosphate, triethyl phosphate, trimethyl phosphate, triphenyl phosphate, tris(1,3-dichloro-2-propyl) phosphate, tris(2-butoxyethyl)phosphate, tris(2-chloroethyl) phosphate and tris(2-ethylhexyl)phosphate.

Illustrative examples of the polyol solvents and derivatives thereof include ethylene glycol and ethylene glycol derivatives such as ethylene carbonate, ethylene glycol diacetate, ethylene glycol diethyl ether, ethylene glycol diglycidyl ether, ethylene glycol dimethyl ether, ethylene glycol monoacetate, ethylene glycol monoisopropyl ether, ethylene glycol monoethyl ether, ethylene glycol monoethyl ether acetate, ethylene glycol monophenyl ether, ethylene glycol monobutyl ether, ethylene glycol monobutyl ether acetate, ethylene glycol monohexyl ether, ethylene glycol monomethyl ether, ethylene glycol monomethyl ether acetate and ethylene glycol monomethoxymethyl ether; glycerol and glycerol derivatives such as glycerol glycidyl ether, glycerol-1,3-diacetate, glycerol dialkyl ether, glycerol fatty acid ester, glycerol triacetate, glycerol trilaurate and glycerol monoacetate; diethylene glycol and diethylene glycol derivatives such as diethylene glycol ethyl methyl ether, diethylene glycol chlorohydrin, diethylene glycol diacetate, diethylene glycol diethyl ether, diethylene glycol dibutyl ether, diethylene glycol dibenzoate, diethylene glycol dimethyl ether, diethylene glycol bisallyl carbonate, diethylene glycol monoethyl ether, diethylene glycol monoethyl ether acetate, diethylene glycol monobutyl ether, diethylene glycol monobutyl ether acetate and diethylene glycol monomethyl ether; dipropylene glycol and dipropylene glycol derivatives such as dipropylene glycol monoethyl ether, dipropylene glycol monobutyl ether, dipropylene glycol monopropyl ether and dipropylene glycol monomethyl ether; triethylene glycol and triethylene glycol derivatives such as triethylene glycol di-2-ethyl butyrate, triethylene glycol dimethyl ether, triethylene glycol monoethyl ether and triethylene glycol monomethyl ether; tripropylene glycol and tripropylene glycol derivatives such as tripropylene glycol monomethyl ether; propylene glycol and propylene glycol derivatives such as propylene glycol monoethyl ether, propylene glycol monobutyl ether and propylene glycol monomethyl ether; 1,3-octylene glycol, 2-chloro-1,3-propanediol, 3-chloro-1,2-propanediol, cyclohexanediol, tetraethylene glycol, triglycol dichloride, trimethylene glycol, trimethylolethane, trimethylolpropane, 1,2-butanediol, 1,3-butanediol, 1,4-butanediol, 1,4-butenediol, propylene carbonate, propylene chlorohydrin, hexylene glycol, pentaerythritol, 1,5-pentanediol, polyethylene glycol, polyethylene glycol fatty acid ester, poly(oxyethylene-oxypropylene) derivatives, and polypropylene glycol.

Illustrative examples of the carboxylic acid solvents and carboxylic anhydrides include isovaleric acid, isobutyric acid, itaconic acid, 2-ethylhexanoic acid, 2-ethylbutyric acid, oleic acid, caprylic acid, caproic acid, formic acid, valeric acid, acetic acid, dichloroacetic acid, lactic acid, pivalic acid, propionic acid, isobutyric anhydride, itaconic anhydride, acetic anhydride, citraconic anhydride, propionic anhydride, maleic anhydride, butyric anhydride, monochloroacetic acid and butyric acid.

Illustrative examples of the nitrogen-containing compounds include aliphatic amines such as amylamine, allylamine, isobutylamine, isopropanolamines, isopropylamine, N-ethylethanolamine, 2-ethylhexylamine, ethylenediamine, diamylamine, diisobutylamine, diisopropylamine, diisopropylethylamine, diethanolamine, diethylamine, diethylbenzylamine, diethylenetriamine, dioctylamine, cyclohexylamine, dicyclohexylamine, di-n-butylamine, N,N-dibutylethanolamine, tetraethylenepentamine, N,N,N',N'-tetramethylethylenediamine, triamylamine, triethanolamine, triethylamine, trioctylamine, tri-n-butylamine, tripropylamine, trimethylamine, s-butylamine, t-butylamine, N-butylethanolamine, propylenediamine, heptylamine, monoethanolamine, monoethylamine, mono-n-butylamine and monomethylamine; aromatic amines such as aniline, o-chloroaniline, N,N-diethylaniline, diphenylamine, N,N-dibutylaniline, N,N-dimethylaniline, dimethylamine, o-toluidine, N-butylaniline and N-methylaniline; nitrogen-containing heterocyclic compounds such as isoquinoline, imidazole, N-ethylmorpholine, quinoline, α-picoline, β-picoline, γ-picoline, pipecoline, piperazine, piperidine, pyrazine, pyridine, pyrrolidine, N-phenylmorpholine, morpholine, 2,4-lutidine and 2,6-lutidine; amide compounds such as acetamide, caprolactam, N,N-dimethylformamide, 2-pyrrolidone, formamide, N-methylpyrrolidone and N-methylformamide; urea derivatives such as 1,3-dimethyl-2-imidazolidinone and tetramethylurea; nitrile compounds such as acetonitrile, ethyl cyanoacetate, butyronitrile and propionitrile; nitro compounds such as o-nitroanisole, o-nitroaniline, nitroethane, 1-nitropropane, 2-nitropropane, nitrobenzene, nitromethane and benzonitrile; hydrazine, and hexamethylphosphortriamide.

Illustrative examples of the sulfur-containing compounds include sulfur dioxide, diethyl sulfate, diphenylsulfone, dimethyl sulfoxide, dimethyl sulfate, sulfolane, thioanisole, thiophene, tetrahydrothiophene, carbon disulfide and propane sultone.

Illustrative examples of the fluorine compounds include dichlorodifluoromethane, 1,1-dichloro-1-fluoroethane, difluorobenzenes, 1,1,2,2-tetrachlorodifluoroethane, 2,2,3,3-tetrafluoropropanol, dodecafluorocyclohexane, 1,1,2-trichlorotrifluoroethane, trichlorofluoromethane, trifluoroacetamide, ethyl 4,4,4-trifluoroacetoacetate, trifluoroethanol, trifluoroacetic acid, trifluoroacetic acid ester, 1,1,1-trifluoro-2,2-dichloroethane, trifluoromethane sulfonic acid, (trifluoromethyl)anilines, (trifluoromethyl)pyridines, p-trifluoromethylbenzonitrile, perfluoroalkane, 2-perfluoroalkylethanol, perfluoroalkylethylene, perfluoroalkyl carboxylic acid, perfluorotetrahydrofuran, perfluorotrialkylamine, perfluorobutyltetrahydrofuran, perfluoropolyethers, fluoroanilines, fluoroisophthalonitriles, fluorophenols, fluorobenzene, hexafluoroacetone trihydrate, hexafluoroisopropanol, hexafluoropropylene, hexafluorobenzene, benzotrifluoride, pentafluorodichloropropane, pentafluorophenol and 2,2,3,3,3-pentafluoropropanol.

Illustrative examples of the inorganic solvents include ammonia water, liquid ammonia, liquid carbon dioxide, hydrochloric acid, phosphorus oxychloride, chlorosulfonic acid, heavy water, nitric acid, silicone, hydrofluoric acid, polyphosphoric acid, water, sulfuric acid and phosphoric acid.

The boiling point of the first solvent which is the low boiling point solvent is not particularly limited as long as the relation with the second solvent (high boiling point solvent) is satisfied, and the first solvent preferably has a boiling point of 30 to 400° C., more preferably 35 to 285° C., even more preferably less than 170° C., still more preferably at least 35° C. but less than 170° C., and most preferably at least 35° C. but less than 140° C. in terms of ease of handling.

The second solvent (high boiling point solvent) preferably has a boiling point of 45 to 415° C., more preferably 72 to 333° C., even more preferably 110 to 250° C. and most preferably 155 to 250° C. in terms of ease of removal in the solvent removal step to be described later.

The contents of the first and second solvents in the solution is not particularly limited, and the weight ratio of the second solvent to the first solvent (second solvent/first solvent) is preferably from 0.001 to 5 and more preferably from 0.01 to 2 in terms of ease of film formation.

One or more than one solvent may be used for each of the first and second solvents. In cases where at least one of the first and second solvents is a mixture of a plurality of solvents, the relation should be satisfied between the solvent component with the lowest boiling point used in the second solvent and the solvent component with the highest boiling point used in the first solvent.

The difference between the solubility parameter of the first solvent and that of the second solvent is not particularly limited and is preferably from 0 to 5 and more preferably from 0 to 4 because a more highly controlled microphase-separated morphology is obtained.

The solubility parameter is a value obtained by the method described in Polymer Handbook, Fourth Edition, Volume 2, (A John Wiley & Sons, Inc., Publication), J. BRANDRUP, E. H. IMMERGUT and E. A. GRULKE (1999), pp. 675-714.

The difference between the solubility parameter of one polymer chain making up the above-described block copolymer and the solubility parameter of the second solvent is preferably from 0 to 5 and more preferably from 0 to 4 because a more highly controlled microphase-separated morphology is obtained.

The solubility parameter of the polymer chain can be estimated from the molecular structure. Numerous methods for calculating the theoretical solubility parameter have been proposed, including those of Small, Hoy and Fedors. Of these, Fedors theoretical solubility parameter does not require the polymer density parameter, and thus is an effective method of calculation also for polymers having a novel structure (see Nippon Setchaku Kyokaishi 22, No. 10, 564-567 (1986)). In Fedors method of calculation, the theoretical solubility parameter (units: $(cal/cm^3)^{1/2}$) can be determined by formula I below using the bond energy and energy of molecular motion $\Delta ei$ possessed by the atoms or atomic groups such as polar radicals making up the polymer, the bond energy and energy of molecular motion $\Sigma \Delta ei$ of repeating units making up the polymer, the occupied volume $\Delta vi$ of atoms or atomic groups such as polar radicals making up the polymer, and the occupied volume $\Sigma \Delta vi$ of repeating units making up the polymer.

$$SP=(\Sigma \Delta ei / \Sigma \Delta vi)^{1/2} \quad \text{Formula 1}$$

The weight ratio between the block copolymer and the solvents (first solvent and second solvent) is not particularly limited and the total amount of the first solvent and the second solvent is preferably from 4 to 999 parts by weight and more preferably from 9 to 99 parts by weight with respect to 1 part by weight of the block copolymer.

The volumetric ratio between the volume of the block copolymer ($\Phi$poly) and the total volume ($\Phi$poly+$\Phi$sol) of the volume of the block copolymer ($\Phi$poly) and the volume of the second solvent ($\Phi$sol) in the solution [$\Phi$poly/($\Phi$poly+$\Phi$sol)] is preferably from 0.1 to 0.75, more preferably from 0.1 to 0.7 and even more preferably from 0.1 to 0.65 because the heating step to be described later proceeds in a shorter time.

The volume of the block copolymer is derived from the density of the polymer chains making up the block copolymer. Numeric values described in, for example, Polymer Handbook, Fourth Edition, Volume 2, (A John Wiley & Sons, Inc., Publication), J. BRANDRUP, E. H. IMMERGUT and E. A. GRULKE (1999) may be used for the density of the polymer chains. The volume of the second solvent is derived from the weight and density of the solvent.

(Substrate)

The substrate of the present invention is used to support the film having the microphase-separated morphology to be described later and its type is not particularly limited. Exemplary substrates include a quartz substrate, a silicon wafer, a glass substrate, and a flexible substrate. Of these, a flexible substrate is preferred in terms of ease of handling.

Illustrative examples of the flexible substrate include substrates of polymers such as polyimide (PI), polyethersulfone (PES), polymethyl methacrylate (PMMA), polycarbonate (PC), cycloolefin polymer (COP), polyethylene naphthalate (PEN), polyethylene terephthalate (PET), polypropylene (PP), liquid-crystal polymer (LCP), polydimethylsiloxane (PDMS) and triacetyl cellulose (TAC); and metal films such as copper foil and aluminum foil. Of these, polymer substrates are preferred on account of easy workability and ease of handling. Substrates of polyimide, polyethylene naphthalate, polycarbonate and polyethylene terephthalate are especially preferred because of their high heat resistance, excellent solvent resistance and good mechanical strength.

(Silane Coupling Agent)

The substrate may optionally have a silane coupling agent layer formed from a silane coupling agent on its surface. The type of silane coupling agent is suitably selected. However, to further increase the orderliness of the microphase-separated morphology of the subsequently described block copolymer layer, preferred use may be made of a silane coupling agent of general formula (1) below.

General formula (1)

In general formula (1), X is a functional group, illustrative examples of which include amino, carboxyl, hydroxyl, aldehyde, thiol, isocyanate, isothiocyanate, epoxy, cyano, dimethylamino, diethylamino, hydrazino, hydrazide, vinyl sulfone, vinyl, alkyl (having preferably 1 to 20 carbon atoms, and more preferably 6 to 18 carbon atoms) and alkoxy groups, and hydrogen atom. Of these, an alkyl group, an alkoxy group and hydrogen atom are preferred.

In general formula (1), R is a hydrogen atom or an alkyl group having 1 to 6 carbon atoms. Of these, methyl and ethyl are preferred. In cases where there are a plurality of R moieties in general formula (1), the R moieties may be the same or different.

In general formula (1), Y is a hydrolyzable group. Illustrative examples include alkoxy groups (e.g., methoxy group, ethoxy group), halogen atoms (fluorine atom, chlorine atom, bromine atom, iodine atom), and acyloxy groups (e.g., acetoxy group, propanoyloxy group). Of these, methoxy group, ethoxy group and chlorine atom are preferred because of the good reactivity they confer.

In general formula (1), L is a linkage group or merely a bond. Illustrative examples include alkylene groups (preferably having 1 to 20 carbon atoms), —O—, —S—, arylene groups, —CO—, —NH—, —SO$_2$—, —COO—, —CONH— and groups that are combinations thereof. Of these, alkylene groups are preferred.

In cases where L represents merely a bond, the X moiety in general formula (1) is directly linked to silicon.

In general formula (1), the letter m is an integer from 0 to 2 and the letter n is an integer from 1 to 3, such that n+m=3. The letter m is preferably 1 or 2, and the letter n is preferably 1 or 2.

Illustrative examples of the silane coupling agent that may be used in the present invention include, but are not limited to, methoxyphenylpropyltrichlorosilane, octadecyltrimethoxysilane, ethyldimethylchlorosilane, dimethylaminopropyltrimethoxysilane, diethylaminopropyltrimethoxysilane, chlorotrimethylsilane, dichlorodimethylsilane, phenyldimethylchlorosilane, perfluorodecyltriethoxysilane, p-methoxyphenylpropylmethyldichlorosilane, γ-aminopropyltrimethoxysilane, N-β(aminoethyl)-γ-aminopropyltrimethoxysilane, γ-aminopropylmethyldiethoxysilane, γ-mercaptopropyltrimethoxysilane and γ-glycidoxypropyltriethoxysilane.

No particular limitation is imposed on the method of forming a silane coupling layer from the silane coupling agent. For example, the methods described in the book entitled Shiran kappuringu-zai no kōka to shiyōhō [Silane coupling agents: effects and uses] (Y. Nakamura, ed.; published on Jun. 20, 2006 by Science & Technology Co., Ltd.) may be used for this purpose. Illustrative examples include methods in which the silane coupling agent is coated, either directly as is or after dissolution in a solvent, onto the substrate; and methods in which the substrate is immersed in a solution containing the silane coupling agent.

In cases where the thickness of the layer formed from the silane coupling agent is equal to or larger than the surface roughness $R_a$ of the substrate, the microphase-separated morphology obtained may have cylindrical or lamellar microdomains oriented normal (perpendicularly) to the substrate. The layer formed from the silane coupling agent can be made thicker by using a silane coupling agent having a long molecular chain, and can be made thinner by using a silane coupling agent having a short molecular chain. The layer thickness can be measured by a technique such as cross-sectional TEM analysis. A simple method that may be used for estimating the layer thickness is molecular computation with a program such as MOPAC (e.g., WinMOPAC (Ver. 3.9.0)).

The thickness of the layer formed from the silane coupling agent is preferably equal to or larger than the surface roughness of the substrate as described above. More specifically, the thickness is preferably from 0.5 to 10 nm, more preferably from 1 to 5 nm and most preferably from 2 to 5 nm. Within the above range, a cylindrical or lamellar microphase-separated morphology having a more ordered array can be obtained.

(Coating Method)

Next, the procedure of the film-forming step is described in detail.

The coating method used to apply the solution containing the above-described block copolymer and first and second solvents to the substrate is not subject to any particular limitation as long as the film can be formed. Common coating methods which may be used include spin coating, solvent casting, dip coating, roll coating, curtain coating, slide coating, extrusion coating, bar coating and gravure coating. From the standpoint of productivity and other considerations, spin coating is preferred. The spin coating conditions are suitably selected according to the block copolymer used.

In this step, the first solvent contained in the film is removed during the formation of the film by coating. The removal method is not particularly limited and Exemplary methods include a method in which drying treatment by heating is performed at atmospheric pressure or reduced pressure, and an air drying method. When heating treatment is performed, the upper limit temperature is preferably higher by 15° C. and more preferably by 30° C. than the boiling point of the first solvent, and even more preferably the boiling point of the first solvent. Too high a treatment temperature may cause the second solvent as well to vaporize in a large amount so that it may take a long time to obtain the microphase-separated morphology in the heating step to be described later. When heating treatment is performed, the lower limit temperature is not particularly limited and is suitably selected according to the type of the first solvent used. However, a temperature above the room temperature is usually preferred.

The formation of the film and the removal of the first solvent may be performed at the same time and the film may be formed while removing the first solvent by adjusting the spin coating conditions.

The first solvent should be substantially removed from the film formed, but part of the first solvent may remain in the film.

In addition, part of the second solvent may be removed during the removal of the first solvent as long as the formation of the microphase-separated morphology in the heating step to be described later is not hindered. More specifically, at the end of the film-forming step, the second solvent is preferably contained in an amount of 30 to 900 parts by weight and more preferably from 35 to 850 parts by weight with respect to 100 parts by weight of the block copolymer in the film.

(Heating Step)

The heating step is a step in which the film obtained by the film-forming step is heated at a temperature which is higher than the boiling point of the first solvent but is lower than the boiling point of the second solvent to make the film formed have a microphase-separated morphology. The film obtained by the film-forming step contains a predetermined amount of the second solvent, which serves as the plasticizer of the polymer chains making up the block copolymer. Therefore, the polymer chains plasticized by the second solvent have improved mobility to enable the microphase-separated morphology to be formed in the film in a short time under low-temperature conditions.

The heating conditions include heating at a temperature which is higher than the boiling point of the first solvent but is lower than the boiling point of the second solvent. Heating within the above-defined range enables the mobility of the polymer chains to be maintained at a high level while suppressing the volatilization of the second solvent serving as the plasticizer.

In order to form the microphase-separated morphology in a shorter time, heating is preferably performed at a temperature which is higher by at least 10° C. and more preferably at least 20° C. than the boiling point of the first solvent and at a temperature which is lower by at least 30° C. and more preferably at least 50° C. than the boiling point of the second solvent.

More specifically, the heating temperature is preferably up to 170° C., more preferably from 80 to 170° C., even more preferably from 80 to 150° C., and most preferably from 100 to 140° C.

The heating time is appropriately adjusted by the heating temperature and a shorter time is more preferred. More specifically, the heating time is preferably up to 30 minutes, more preferably up to 20 minutes and even more preferably up to 10 minutes. The lower limit of the heating time depends on the heating temperature but is usually at least 10 seconds.

Part of the second solvent contained in the film may vaporize during the heating step as long as the merits of the present invention are not impaired.

(Solvent Removal Step)

The solvent removal step is a step in which the second solvent is removed from the film having the microphase-separated morphology as obtained by the heating step to form a polymer film having the microphase-separated morphology. The term "polymer film" as used herein refers to a film substantially free of solvent. More specifically, the solvent is preferably contained in the polymer film in an amount of up to 10 wt % and more preferably up to 5 wt %.

The method of removing the second solvent contained in the film is not particularly limited and exemplary methods include a method in which drying treatment by heating is performed at atmospheric pressure or reduced pressure, a method of cleaning with a solvent or water, and an air drying method. The upper limit of the temperature at which heating treatment is performed is preferably higher by about 10° C. than the boiling point of the second solvent. Too high a treatment temperature may cause the second solvent to abruptly vaporize to destroy the microphase-separated morphology. The lower limit temperature during heating treatment is not particularly limited and a temperature which is lower by 50° C. than the boiling point of the second solvent is more preferred.

In cases where the film has a thickness of up to 800 nm (preferably 10 to 500 nm), the second solvent can also be removed by heating treatment at a temperature lower by about 100° C. than the boiling point of the second solvent. Although the details are not known, the solvent removal is presumed to be relevant to the reduced film thickness.

Heating treatment in the heating step and heating treatment in the solvent removal step may be performed as consecutive treatments. More specifically, the heating step at a predetermined temperature may be followed by solvent removal under the same conditions (at the same heating temperature).

(Polymer Film)

The polymer film obtained by the above-described manufacturing method has the microphase-separated morphology, which can be suitably designed by changing the length and type of the polymer chains making up the block copolymer.

The thickness of the polymer film is not particularly limited and may be controlled by suitably changing the amount of block copolymer used. The polymer film thickness is preferably from 10 to 1000 nm, more preferably from 20 to 900 nm and most preferably from 30 to 800 nm because the microphase-separated morphology can be formed under lower-temperature conditions in a shorter time.

The layer thickness is obtained by taking measurements at three or more random points with a suitable known apparatus such as a profiler (KLA-Tencor Corp.), and calculating the arithmetical mean of the measurements.

(Microphase-Separated Morphology)

The microphase-separated morphology of the polymer film may be suitably selected by controlling the length and type of the polymer chains in the block copolymer used. Exemplary morphologies include a spherical micelle morphology, a co-continuous morphology, a cylindrical morphology and a lamellar morphology.

It is particularly preferred for one of the phases making up the microphase-separated morphology to have a morphology oriented in a fixed direction in terms of the application to the uses described below. More specifically, the microphase-separated morphology in which the cylindrical or lamellar phase is oriented perpendicularly or horizontally with respect to the substrate is preferred.

(Cylindrical Microphase-Separated Morphology)

Figure 1A:
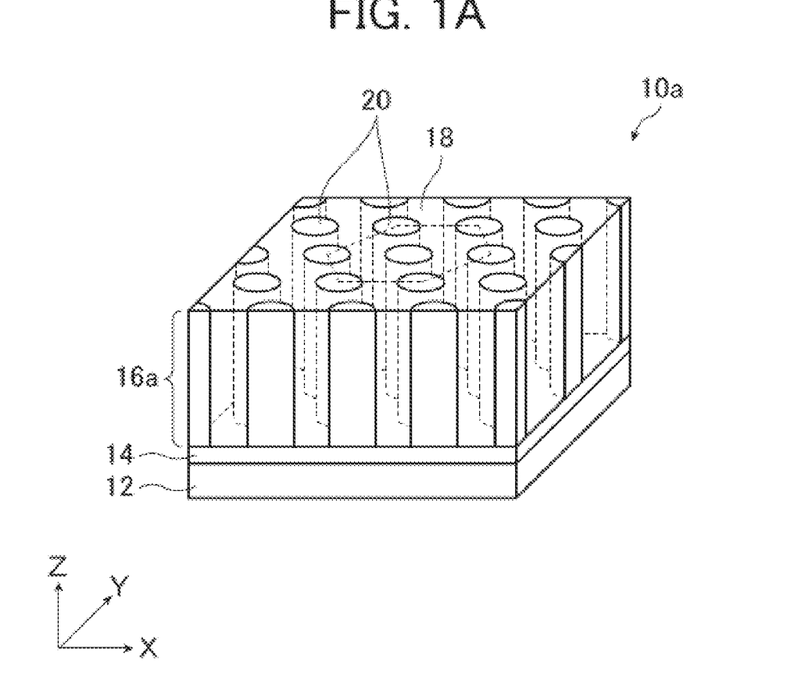
FIG. 1A is a perspective, cross-sectional view showing a multilayer body including a polymer film having a cylindrical microphase-separated morphology according to an embodiment of the invention.

FIG. 1A shows a perspective, cross-sectional view of a multilayer body 10a which includes a polymer film having a cylindrical microphase-separated morphology obtained by using a diblock copolymer (in which polymer A and polymer B are bonded at the ends thereof). "Cylindrical microphase-separated morphology" refers herein to a structure in which one of the separated phases is cylindrical (columnar). The thicknesses of a substrate 12, a silane coupling agent layer 14 and a polymer film 16a are not limited to the case shown in FIG. 1A.

Figure 1B:
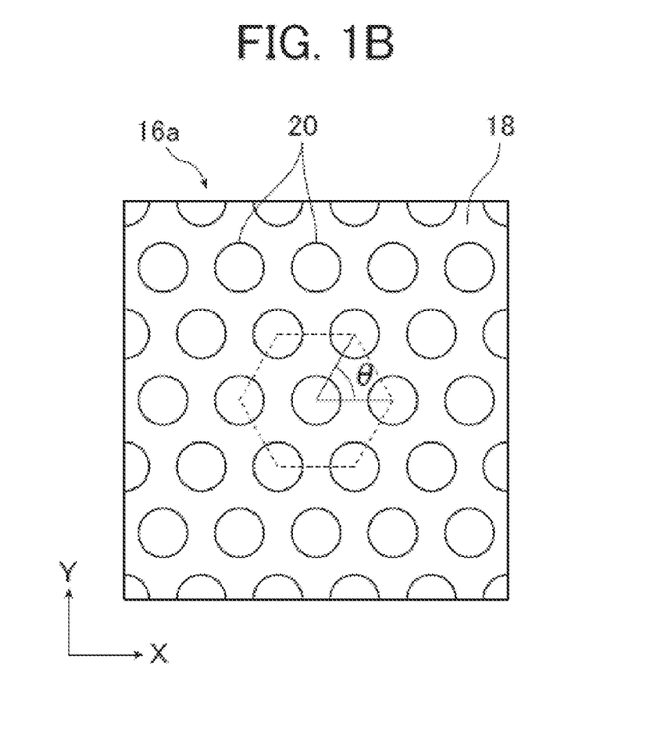
FIG. 1B is a top view of the same.

As shown in FIG. 1A, the polymer film 16a has the microphase-separated morphology composed of a continuous phase 18 and cylindrical microdomains 20 distributed within the continuous phase 18, and is situated on the substrate 12. The continuous phase 18 and the cylindrical microdomains 20 are respectively formed of polymer A and polymer B which make up the block copolymer. The cylindrical microdomains 20 are distributed within the continuous phase 18 and oriented substantially perpendicularly to the substrate 12 in the Z-axis direction (direction normal to the substrate surface) in FIG. 1A. In other words, the longitudinal direction of the cylindrical microdomains 20 is substantially parallel to the thickness direction of the polymer film 16a. As shown in FIG. 1B, the cylindrical microdomains 20 preferably have a zigzag arrangement in the horizontal plane of the applied film (the plane XY in FIG. 1B), and most preferably form an ordered array having a hexagonal lattice-like pattern. Here, "hexagonal lattice-like" denotes a structure in which the angle between one microdomain and two adjacent microdomains is substantially 60 degrees (where "substantially 60 degrees" means from 50 to 70 degrees, and preferably from 55 to 65 degrees). The ordered array of microdomains, although exemplified here by assuming a hexagonal lattice-like pattern, is not limited to this arrangement. For example, there are also cases in which the ordered array of microdomains assumes a square arrangement. Nor are the cylindrical microdomains 20 limited to being arranged in an ordered pattern; cases in which the cylindrical microdomains 20 are arranged in a non-ordered pattern are also encompassed by the present invention.

The size (diameter) of the cylindrical microdomains 20 may be suitably controlled by, for example, the molecular weight of the block copolymer used, and is preferably from 5 to 200 nm, and more preferably from 10 to 100 nm. In cases where the pores are elliptical, the dimension of the major axis should fall within the above range. The distance between mutually neighboring microdomains (distance between the center axes) may be suitably controlled by means of, for example, the molecular weight of the block copolymer used, and is preferably from 5 to 300 nm, and more preferably from 10 to 150 nm. The size of the microdomains and the distance between the microdomains can be measured by examination with an atomic force microscope or the like.

The term "microdomain" is commonly used to denote the domains in a multiblock copolymer, and is not intended here to specify the size of the domains.

The cylindrical microdomains 20 are oriented perpendicularly (normal) to the substrate 12, and are preferably substantially perpendicular. The expression "substantially perpendicular" here denotes that the center axes of the cylindrical microdomains 20 are inclined to the normal of the substrate at an angle of not more than ±45°, and preferably not more than ±30°. The angle of inclination can be measured by the TEM analysis of ultrathin sections, small-angle x-ray diffraction analysis or some other suitable technique.

Figure 2:
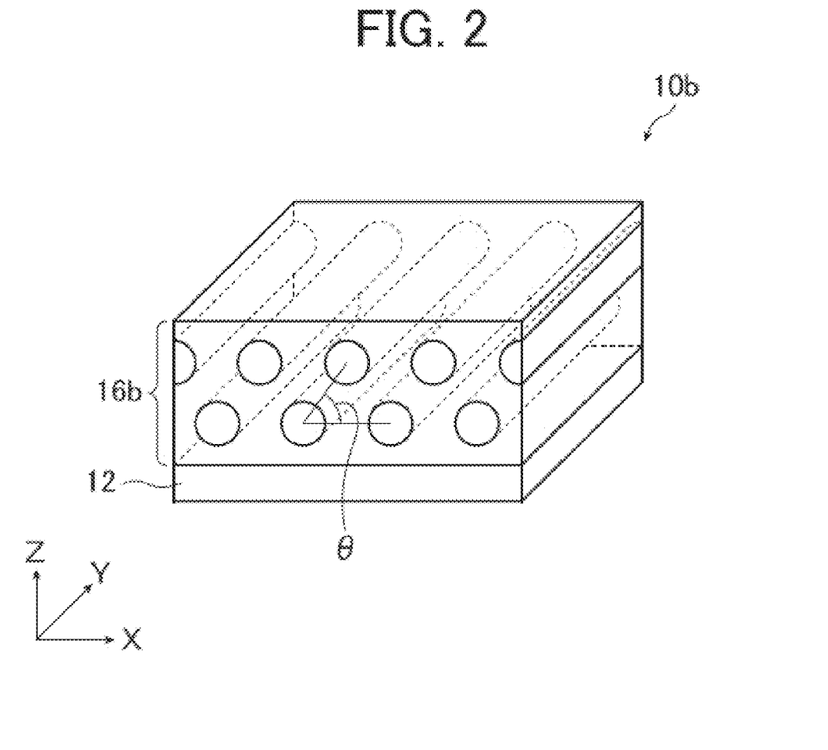
FIG. 2 is a perspective, cross-sectional view showing a multilayer body including a polymer film having a cylindrical microphase-separated morphology according to another embodiment of the invention.

The microphase-separated morphology obtained may be a morphology oriented parallel to the substrate, and its perspective cross-sectional view is shown in FIG. 2. A multilayer body 10b shown in FIG. 2 is of a laminated structure in which the substrate 12 and a polymer film 16b are stacked in this order. As in the above case, the polymer film 16b includes the continuous phase 18 and the cylindrical microdomains 20, and the cylindrical microdomains 20 are oriented substantially parallel to the substrate 12, that is, in the Y-axis direction in FIG. 2. The longitudinal direction of the cylindrical microdomains 20 is parallel to the substrate surface or perpendicular to the thickness direction of the polymer film.

The preferred size (diameter) and layout of the cylindrical microdomains 20 are as defined above. The expression "substantially parallel" as used herein denotes that the center axes of the cylindrical microdomains 20 are inclined to the substrate surface at an angle of not more than ±45°, and preferably not more than ±30°.

(Lamellar Microphase-Separated Morphology)

Figure 3A:
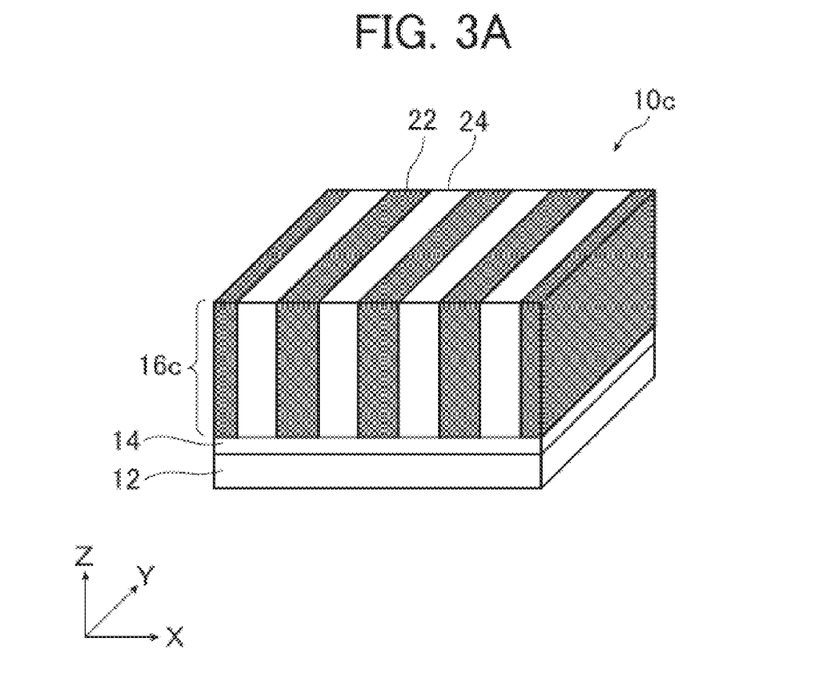
FIG. 3A is a perspective, cross-sectional view showing a multilayer body including a polymer film having a lamellar microphase-separated morphology according to a yet another embodiment of the invention.

Next, FIG. 3A shows a perspective, cross-sectional view of a multilayer body 10c which includes a polymer film 16c having a lamellar microphase-separated morphology as obtained by using a diblock copolymer (in which polymer A and polymer B are bonded at the ends thereof). "Lamellar microphase-separated morphology" refers herein to a structure in which the phases making up the morphology are lamellar (in plate form). The thicknesses of the substrate 12, the silane coupling agent layer 14 and the polymer film 16c are not limited to the case shown in FIG. 3A.

Figure 3B:
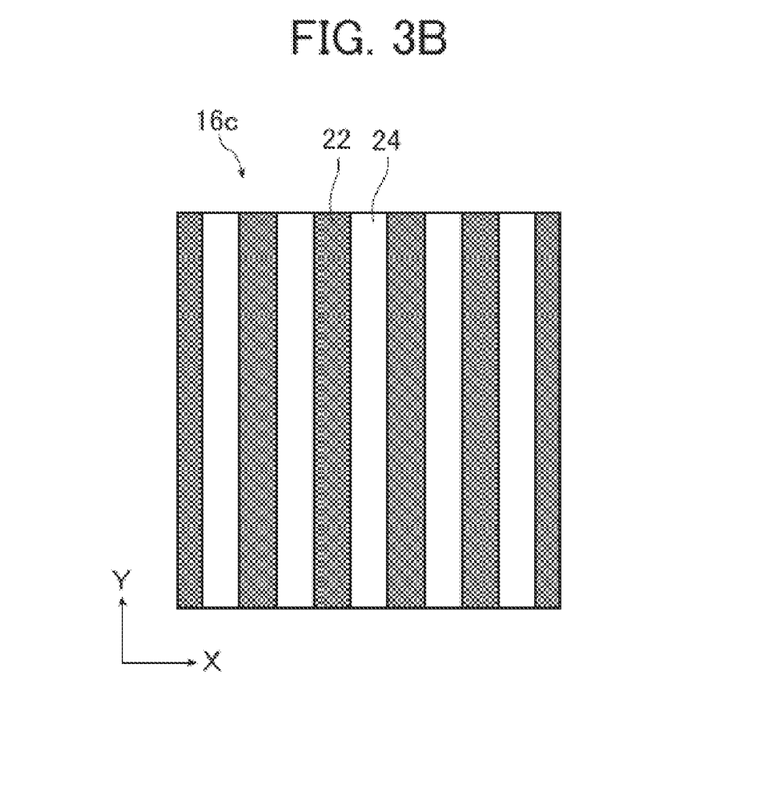
FIG. 3B is a top view of the same.

As shown in FIGS. 3A and 3B, the lamellar phases (phases in plate form) are alternately disposed in the polymer film 16c. The lamellar phases 22 and 24 are formed of, respectively, polymer A and polymer B which make up the block copolymer. The lamellar phases 22 and 24 are oriented perpendicularly (normal) to the substrate 12 in the Z-axis direction in FIG. 3A. In other words, the interfaces between the lamellar phases 22 and 24 are oriented perpendicularly to the substrate 12. The present invention is not limited to cases in which the lamellar phases are arranged in an ordered pattern; cases in which the lamellar phases are arranged, in part, in a non-ordered pattern are also encompassed by the present invention.

The width of the lamellar phases 22 and 24 may be suitably controlled by, for example, the molecular weight of the block copolymer used, and is preferably from 5 to 200 nm, and more preferably from 10 to 100 nm. The width of the lamellar phases can be measured by, for example, examination with an atomic force microscope.

The lamellar phases 22 and 24 are oriented perpendicularly to the substrate, and are preferably substantially perpendicular. The expression "substantially perpendicular" as used herein means that the interfaces between the lamellar phases in the Z-axis direction in FIG. 3A (thickness direction of the polymer film) are inclined to the normal of the substrate at an angle of not more than ±45°, and preferably not more than ±30°. The angle of inclination can be measured by the TEM analysis of ultrathin sections, small-angle x-ray diffraction analysis, or some other suitable technique.

Figure 4:
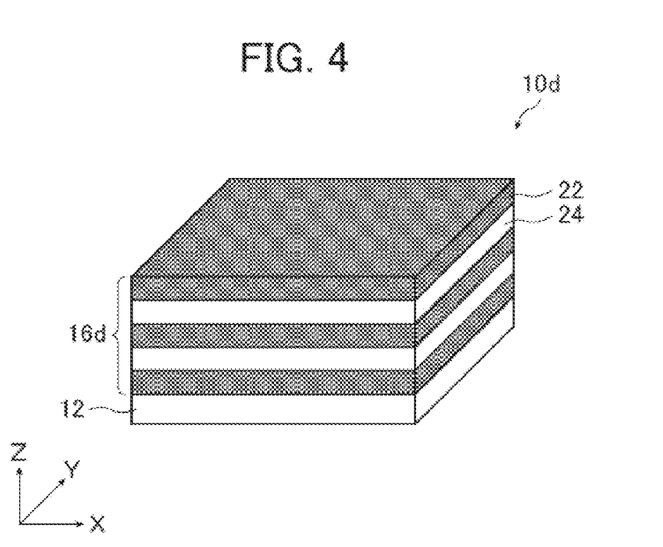
FIG. 4 is a perspective, cross-sectional view showing a multilayer body including a polymer film having a lamellar microphase-separated morphology according to still another embodiment of the invention.

The microphase-separated morphology obtained may be a morphology in which the lamellar phases are oriented parallel to the substrate, and its perspective cross-sectional view is shown in FIG. 4. A multilayer body 10d shown in FIG. 4 is of a laminated structure in which the substrate 12 and a polymer film 16d are stacked in this order. As in the above case, the polymer film 16d includes lamellar phases 22 and 24, which are oriented substantially parallel to the substrate 12 in the XY-axis direction in FIG. 4. The direction of the interfaces between the lamellar phases 22 and 24 is parallel to the substrate surface or perpendicular to the thickness direction of the polymer film.

The preferred width of the lamellar phases 22 and 24 is as defined above. The expression "substantially parallel" as used herein denotes that the interfaces between the lamellar phases 22 and 24 are inclined to the substrate surface at an angle of not more than ±45°, and preferably not more than ±30°.

The polymer film of the present invention is applicable to a wide variety of fields and purposes. Examples of possible applications include photomasks, anisotropic electrically conductive films, anisotropic ion-conductive films, photonic crystals, phase shift films, polarizing films, screens, color filters, components for electronic displays, photoelectric conversion elements, nanoimprint molds, magnetic recording media, acoustic vibration materials, sound-absorbing materials and vibration-damping materials. Use in photomasks, anisotropic electrically conductive films, anisotropic ion-conductive films, photonic crystals, phase shift films and polarizing films is especially promising.

EXAMPLES

Examples of the present invention are provided below by way of illustration and not by way of limitation.

In Examples to be mentioned below, atomic force microscope (AFM) observations were carried out with a SPA-400 system (Seiko Instruments, Inc.). Scanning transmission electron microscope (STEM) observations were carried out with an HD-2300 system (Hitachi High-Technologies Corporation).

Example 1

A silicon wafer with a surface roughness $R_a$ of 0.08 nm having undergone ultrasonic cleaning with acetone and UV ozone cleaning was immersed in a toluene solution containing 0.5 wt % of methoxyphenylpropyltrichlorosilane and allowed to stand for 1 day. After having been allowed to stand, the silicon wafer was washed with toluene and dried to prepare Surface-modified substrate 1 having a silane coupling agent layer. The resulting silane coupling agent layer was a monomolecular layer and had a thickness as calculated by WinMOPAC (Ver.3.9.0) of about 1.3 nm.

Next, a solution of toluene (first solvent with a boiling point of 110° C. and a solubility parameter of 18.2) containing 1.0 wt % of block copolymer PS-b-PMMA (Mw of PS=37,000; Mw of PMMA=37,000; P3968 available from Polymer Source, Inc.) and 1.0 wt % of dicyclohexyl phthalate (second solvent with a boiling point of about 200° C. and a solubility parameter of 20.3) was prepared. The volumetric ratio between the volume of the block copolymer (Φpoly) and the total volume (Φpoly+Φsol) of the volume of the block copolymer (Φpoly) and that of the second solvent (Φsol) in the solution [Φpoly/(Φpoly+Φsol)] was 0.51. PS making up the block copolymer had a solubility parameter of 18.6, and the difference from the solubility parameter of the dicyclohexyl phthalate was 1.7.

The thus prepared toluene solution was spin-coated at 1,500 rpm for 30 seconds onto the resulting Surface-modified substrate 1 at room temperature and atmospheric pressure, and the toluene solvent was removed to form a film with a thickness of 62 nm. The NMR measurements confirmed that the dicyclohexyl phthalate did not vaporize but remained in the film at the end of spin coating.

Next, the resulting film was heated at 140° C. for 1 minute under atmospheric pressure to form a microphase-separated morphology in the film. The AFM measurements on the resulting film confirmed that a morphology having lamellar phases oriented perpendicularly to the substrate was formed.

Figure 5:
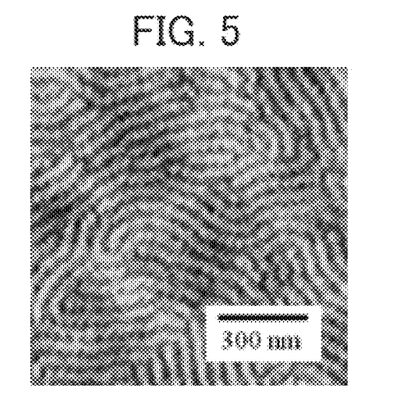
FIG. 5 is an AFM image from the top side of the polymer film obtained in Example 1.

Then, the resulting film was heated at 140° C. for 10 minutes to remove the dicyclohexyl phthalate, thereby forming a polymer film with a thickness of 44 nm. The surface AFM image of the polymer film obtained is shown in FIG. 5. It was confirmed from the AFM image and TEM examination of the morphology in the film thickness direction that a perpendicular lamellar phase-separated morphology in which lamellar phases with a lamellar phase width of 49 nm were oriented in the polymer film perpendicularly to the substrate was formed.

Example 2

A solution of toluene (first solvent with a boiling point of 110° C.) containing 1.0 wt % of block copolymer PS-b-PMMA (Mw of PS=52,000; Mw of PMMA=52,000; P3997 available from Polymer Source, Inc.) and 2.0 wt % of dicyclohexyl phthalate (second solvent with a boiling point of about 200° C.) was prepared. The volumetric ratio between the volume of the block copolymer (Φpoly) and the total volume (Φpoly+Φsol) of the volume of the block copolymer (Φpoly) and that of the second solvent (Φsol) in the solution [Φpoly/(Φpoly+Φsol)] was 0.34.

Figure 6:
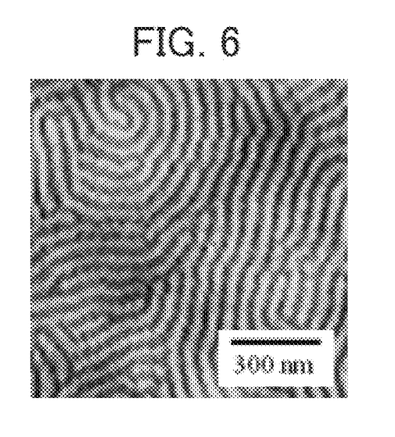
FIG. 6 is an AFM image from the top side of the polymer film obtained in Example 2.

Example 1 was repeated except that the above solution was used instead, thereby preparing a polymer film with a thickness of 52 nm. The surface AFM image of the polymer film obtained is shown in FIG. 6. It was confirmed from the AFM image and TEM examination of the morphology in the film thickness direction that a perpendicular lamellar phase-separated morphology in which lamellar phases with a lamellar phase width of 57 nm were oriented in the resulting polymer film perpendicularly to the substrate was formed.

Example 3

A solution of toluene (first solvent with a boiling point of 110° C.) containing 1.0 wt % of block copolymer PS-b-PMMA (Mw of PS=52,000; Mw of PMMA=52,000; P3997 available from Polymer Source, Inc.) and 4.0 wt % of bis(2-ethylhexyl) phthalate (second solvent with a boiling point of 385° C. and a solubility parameter of 18.6) was prepared. The volumetric ratio between the volume of the block copolymer ($\Phi$poly) and the total volume ($\Phi$poly+$\Phi$sol) of the volume of the block copolymer ($\Phi$poly) and that of the second solvent ($\Phi$sol) in the solution [$\Phi$poly/($\Phi$poly+$\Phi$sol)] was 0.18. PS making up the block copolymer had a solubility parameter of 18.6, and the difference from the solubility parameter of the bis(2-ethylhexyl) phthalate was 0.

The thus prepared toluene solution was spin-coated at 1,500 rpm for 30 seconds onto the resulting Surface-modified substrate 1 at room temperature under atmospheric pressure, and the toluene solvent was removed to form a film with a thickness of 73 nm.

Figure 7:
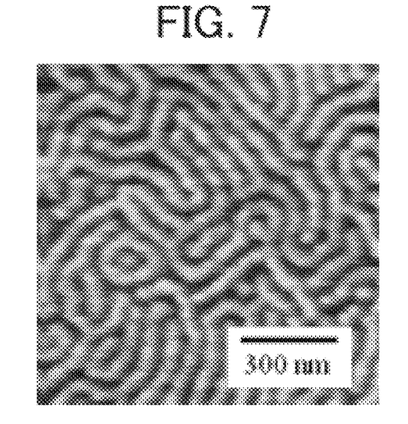
FIG. 7 is an AFM image from the top side of the polymer film obtained in Example 3.

Next, the resulting film was heated at 140° C. for 10 minutes under atmospheric pressure to form a microphase-separated morphology in the film. Subsequently, the film was washed with methanol to remove the bis(2-ethylhexyl) phthalate. The surface AFM image of the resulting polymer film with a thickness of 55 nm is shown in FIG. 7. It was confirmed from the AFM image and TEM examination of the morphology in the film thickness direction that a perpendicular lamellar phase-separated morphology in which lamellar phases with a lamellar phase width of 78 nm were oriented in the resulting polymer film perpendicularly to the substrate was formed.

Example 4

A $SiO_2$ thin film was vapor-deposited to a thickness of about 50 nm on a polyethylene naphthalate substrate (Q65FA available from Teijin DuPont Films Japan Limited). The thin film had a surface roughness $R_a$ of 1.1 nm. Then, the resulting substrate was immersed in a toluene solution containing 0.5 wt % of methoxyphenylpropyltrichlorosilane and allowed to stand for 1 day. After having been allowed to stand, the polyethylene naphthalate substrate was washed with toluene and dried to prepare Surface-modified substrate 2 having a silane coupling agent layer. The resulting silane coupling agent layer was a monomolecular layer and had a thickness as calculated by WinMOPAC (Ver.3.9.0) of about 1.3 nm.

A solution of toluene (first solvent with a boiling point of 110° C.) containing 1.0 wt % of block copolymer PS-b-PMMA (Mw of PS=52,000; Mw of PMMA=52,000; P3997 available from Polymer Source, Inc.) and 2.0 wt % of dicyclohexyl phthalate (second solvent with a boiling point of about 200° C.) was prepared. The volumetric ratio between the volume of the block copolymer ($\Phi$poly) and the total volume ($\Phi$poly+$\Phi$sol) of the volume of the block copolymer ($\Phi$poly) and that of the second solvent ($\Phi$sol) in the solution [$\Phi$poly/($\Phi$poly+$\Phi$sol)] was 0.34.

Figure 8:
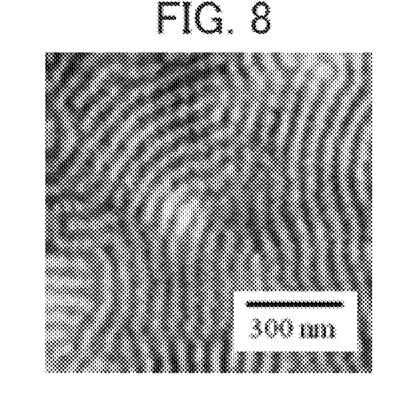
FIG. 8 is an AFM image from the top side of the polymer film obtained in Example 4.

Example 1 was repeated except that Surface-modified substrate 2 and the above solution were used instead, thereby preparing a polymer film with a thickness of 57 nm. The surface AFM image of the polymer film obtained is shown in FIG. 8. It was confirmed from the AFM image and TEM examination of the morphology in the film thickness direction that a perpendicular lamellar phase-separated morphology in which lamellar phases with a lamellar phase width of 53 nm were oriented in the resulting polymer film perpendicularly to the substrate was formed.

Example 5

A solution of toluene (first solvent with a boiling point of 110° C.) containing 1.0 wt % of block copolymer PS-b-PMMA (Mw of PS=68,000; Mw of PMMA=21,500; P7551 available from Polymer Source, Inc.) and 0.5 wt % of dicyclohexyl phthalate (second solvent with a boiling point of about 200° C.) was prepared. The volumetric ratio between the volume of the block copolymer ($\Phi$poly) and the total volume ($\Phi$poly+$\Phi$sol) of the volume of the block copolymer ($\Phi$poly) and that of the second solvent ($\Phi$sol) in the solution [$\Phi$poly/($\Phi$poly+$\Phi$sol)] was 0.68.

Figure 9:
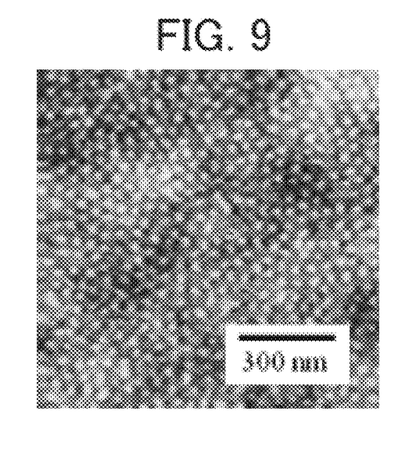
FIG. 9 is an AFM image from the top side of the polymer film obtained in Example 5.

Example 1 was repeated except that the above solution was used instead, thereby preparing a polymer film with a thickness of 53 nm. The surface AFM image of the polymer film obtained is shown in FIG. 9. It was confirmed from the AFM image and TEM examination of the morphology in the film thickness direction that a perpendicular cylindrical phase-separated morphology in which cylindrical microdomains with a microdomain diameter of 49 nm were oriented in the resulting polymer film perpendicularly to the substrate was formed.

Example 6

A $SiO_2$ thin film was vapor-deposited to a thickness of about 50 nm on a polyimide substrate (UPILEX-1255 available from Ube Industries, Ltd.). The thin film had a surface roughness $R_a$ of 0.91 nm. Then, the resulting substrate was immersed in a toluene solution containing 0.5 wt % of methoxyphenylpropyltrichlorosilane and allowed to stand for 1 day. After having been allowed to stand, the polyimide substrate was washed with toluene and dried to prepare Surface-modified substrate 3 having a silane coupling agent layer. The resulting silane coupling agent layer was a monomolecular layer and had a thickness as calculated by WinMOPAC (Ver.3.9.0) of about 1.3 nm.

Figure 10:
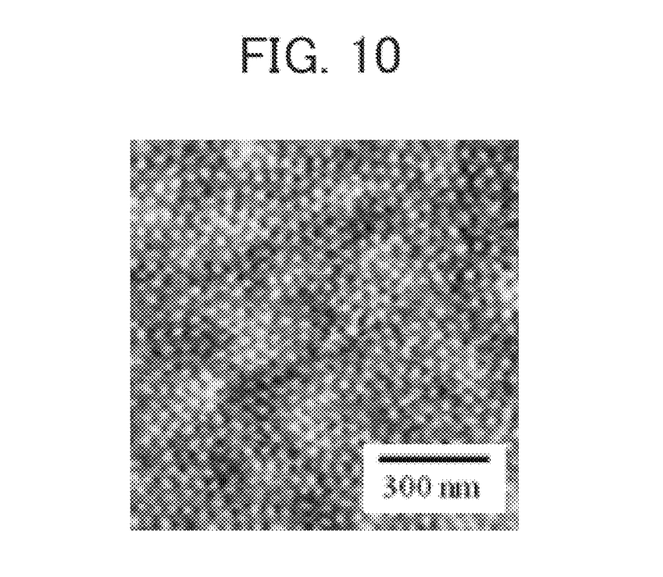
FIG. 10 is an AFM image from the top side of the polymer film obtained in Example 6.

Example 5 was repeated except that Surface-modified substrate 3 was used and the film heating conditions were changed from "140° C. and 1 minute" to "110° C. and 30 minutes", thereby preparing a polymer film with a thickness of 54 nm. The surface AFM image of the polymer film obtained is shown in FIG. 10. It was confirmed from the AFM image and TEM examination of the morphology in the film thickness direction that a perpendicular cylindrical phase-separated morphology in which cylindrical microdomains with a microdomain diameter of 49 nm were oriented in the resulting polymer film perpendicularly to the substrate was formed.

Example 7

Example 1 was repeated except that the film heating conditions for removing the dicyclohexyl phthalate were changed from "140° C. and 10 minutes" to "170° C. and 1 minute", thereby preparing a polymer film. The same polymer film as prepared in Example 1 was obtained.

Comparative Example 1

A toluene solution containing 1.0 wt % of block copolymer PS-b-PMMA (Mw of PS=37,000; Mw of PMMA=37,000; P3968 available from Polymer Source, Inc.) was prepared. Example 1 was repeated except that the above solution was used instead, thereby preparing a polymer film with a thickness of 41 nm. No microphase-separated morphology was formed in the resulting polymer film.

Comparative Example 2

The toluene solution used in Comparative Example 1 was spin-coated at 1,500 rpm for 30 seconds onto Surface-modified substrate 1 under atmospheric pressure, and the toluene solvent was removed to form a film.

Next, the resulting film was heated under atmospheric pressure at 200° C. for 5 hours to prepare a polymer film with a thickness of 37 nm having a perpendicular lamellar phase-separated morphology in which lamellar phases were oriented perpendicularly to the substrate. It was confirmed that a conventional method which does not involve the use of the second solvent requires prolonged heating under high-temperature conditions to form the microphase-separated morphology.

The above results show that the polymer film having the microphase-separated morphology can be manufactured at low temperatures in a short time by using the manufacturing method of the present invention and that this method is also applicable to a roll-to-roll system.

What is claimed is:

1. A method of manufacturing a polymer film having a microphase-separated morphology comprising:
    a film-forming step in which a solution containing a block copolymer having two or more types of polymer chains which are mutually incompatible and are bonded to each other, a first solvent and a second solvent having a higher boiling point by at least 15° C. than the first solvent is applied onto a substrate and the first solvent is removed to form a film;
    a heating step in which the film obtained by the film-forming step is heated at a temperature which is higher than a boiling point of the first solvent but is lower than the boiling point of the second solvent to make the film formed have a microphase-separated morphology; and
    a solvent removal step in which the second solvent is removed from the film having the microphase-separated morphology obtained by the heating step to form the polymer film having the microphase-separated morphology.

2. The method according to claim 1, wherein a volumetric ratio between a volume of the block copolymer ($\Phi$poly) and a total volume ($\Phi$poly+$\Phi$sol) of the volume of the block copolymer ($\Phi$poly) and a volume of the second solvent ($\Phi$sol) in the solution [$\Phi$poly/($\Phi$poly+$\Phi$sol)] is from 0.1 to 0.75.

3. The method according to claim 1, wherein the first solvent has the boiling point of less than 170° C.

4. The method according to claim 1, wherein a heating temperature of 80 to 170° C. is applied in the heating step for forming the film having the microphase-separated morphology.

5. The method according to claim 1, wherein a heating time of up to 30 minutes is applied in the heating step for forming the film having the microphase-separated morphology.

6. The method according to claim 1, wherein the substrate is a flexible substrate.

7. The method according to claim 1, wherein one of the polymer chains making up the block copolymer is selected from the group consisting of polystyrenes, poly(meth)acrylates, polyalkylene oxides, polybutadienes and polyisoprenes.

8. The method according to claim 1, wherein the polymer film has a thickness of 10 to 1,000 nm.

9. The method according to claim 1, wherein the substrate has a silane coupling agent layer formed frm a silane coupling agent on its surface.

10. The method according to claim 1, wherein one of phases in the microphase-separated morphology is a lamellar or cylindrical phase oriented perpendicularly to the substrate.

* * * * *